United States Patent [19]

Nakamura et al.

[11] 4,242,619
[45] Dec. 30, 1980

[54] DIGITAL SERVO CONTROL CIRCUIT

[75] Inventors: Tadahiko Nakamura; Kenji Nakano, both of Kanagawa, Japan

[73] Assignee: Sony Corporation, Tokyo, Japan

[21] Appl. No.: 6,756

[22] Filed: Jan. 26, 1979

[30] Foreign Application Priority Data

Jan. 27, 1978 [JP] Japan ............................... 53/74046

[51] Int. Cl.³ ............................................. H02P 5/16
[52] U.S. Cl. .................................. 318/314; 318/318; 318/341
[58] Field of Search ............... 318/314, 318, 341, 599, 318/606, 607, 608; 235/92 FQ; 328/134; 360/73; 307/233 A; 331/1 A, 12; 226/42; 242/190

[56]     References Cited
         U.S. PATENT DOCUMENTS

| 3,164,777 | 1/1965  | Guanella      | 328/134     |
| 3,295,039 | 12/1966 | MacDonald et al. | 318/314  |
| 3,361,949 | 1/1968  | Brown et al.  | 318/314     |
| 3,643,012 | 2/1972  | Clark et al.  | 328/134     |
| 3,683,345 | 8/1972  | Fauckes et al. | 318/608    |
| 3,686,469 | 8/1972  | Clark et al.  | 179/100.2 T |
| 3,836,756 | 9/1974  | Yammoto et al. | 318/600    |
| 4,047,231 | 9/1977  | Garagnon      | 360/36      |
| 4,086,520 | 4/1978  | Hasyizaki et al. | 318/314  |

FOREIGN PATENT DOCUMENTS 1103731  2/1968  United Kingdom .

Primary Examiner—David Smith, Jr.
Attorney, Agent, or Firm—Lewis H. Eslinger; Alvin Sinderbrand

[57]     ABSTRACT

The duty cycle of a pulse width modulated signal for controlling a drive motor is determined by the content or numbers stored in a counter and representing phase and/or speed errors. The counter is driven by a clock signal which has a number of cycles during each cycle of the pulse width modulated control signal which is exactly equal to the capacity of the counter. The pulse width modulated signal is initiated by a timing pulse and is terminated by the return to zero of the most significant digit of the counter. The time at which the most significant digit of the counter returns to zero in each cycle is determined by a number initially contained in the counter. The content of the counter is periodically determined according to detected speed and phase errors to update the duty cycle of the pulse width modulated control signal.

25 Claims, 44 Drawing Figures

FIG. 3A
FIG. 3B
FIG. 3C
FIG. 3D
FIG. 3E
FIG. 3F
FIG. 3G
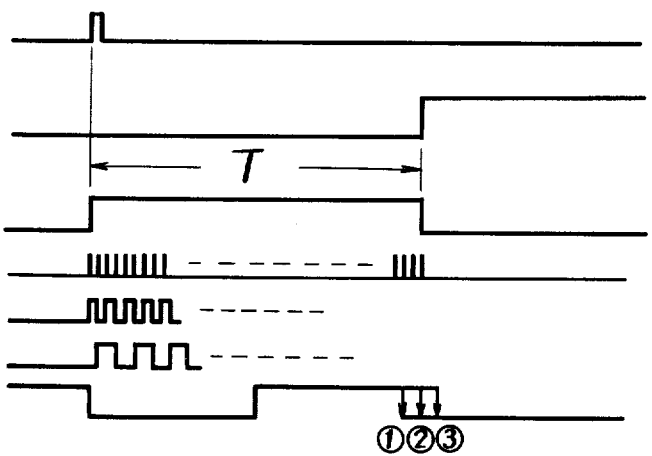
FIG. 4A
FIG. 4B
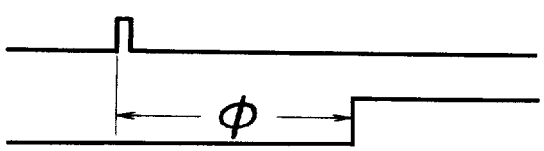

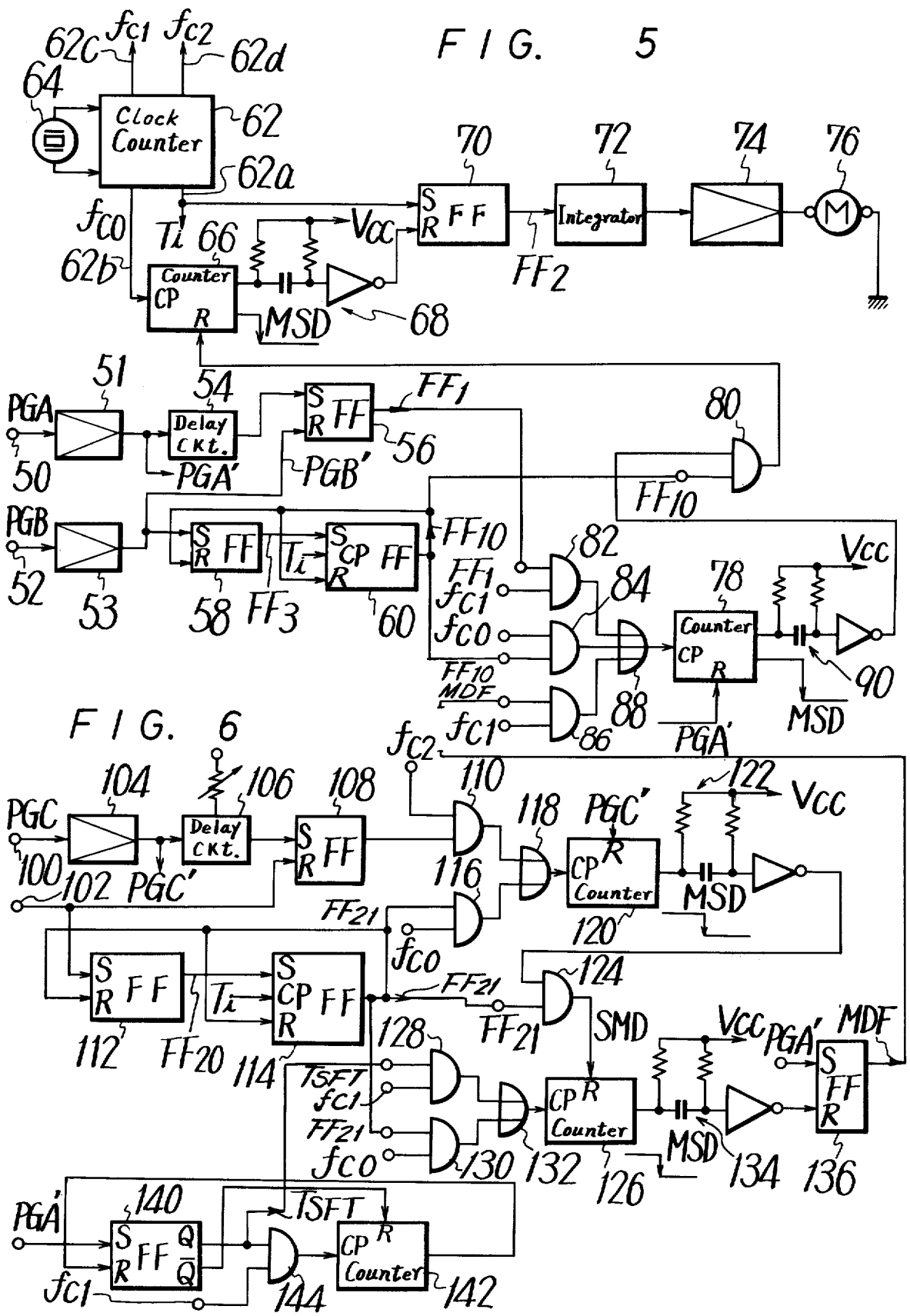

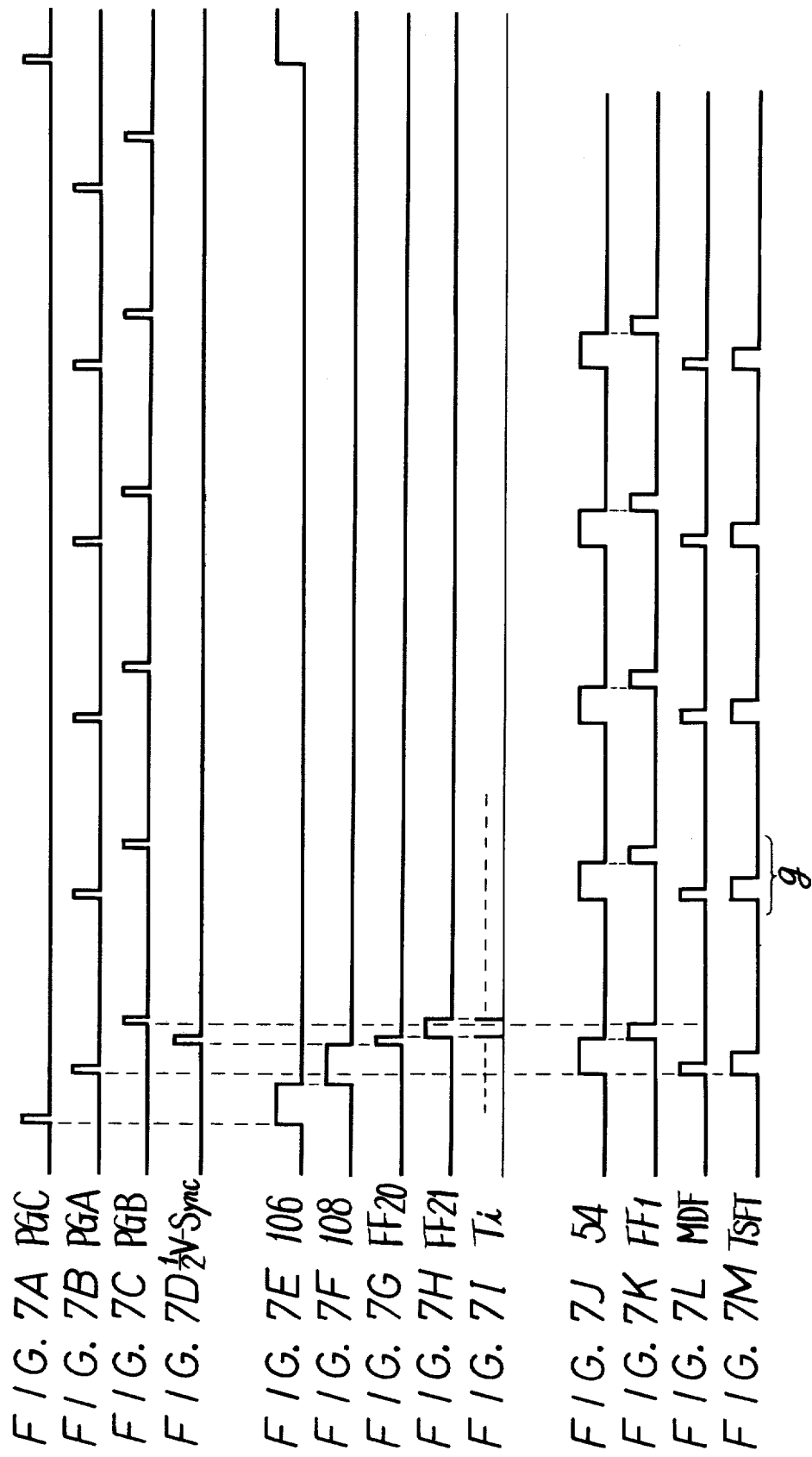

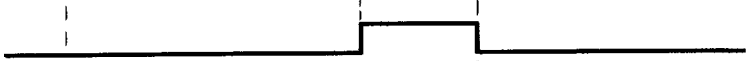
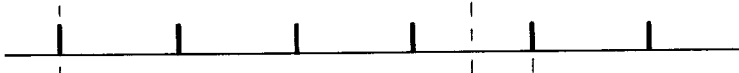
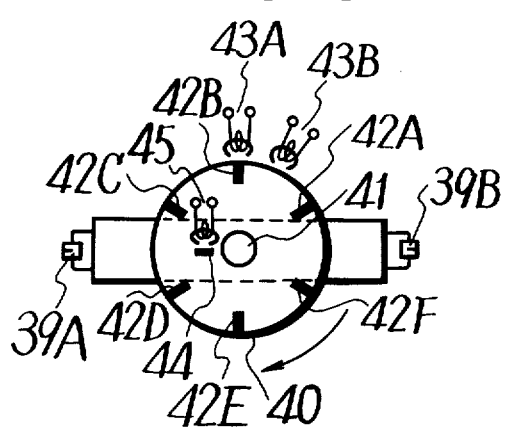
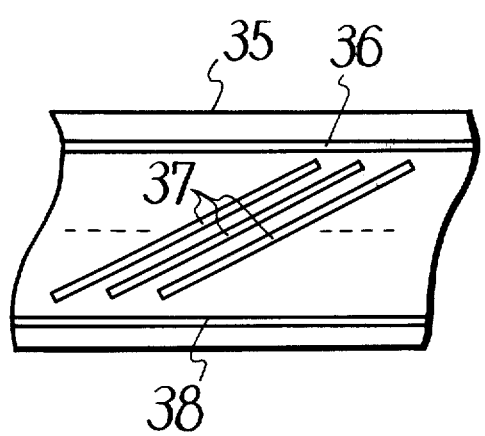

DIGITAL SERVO CONTROL CIRCUIT

BACKGROUND OF THE INVENTION

1. Field of the Invention

This invention relates generally to servo control circuits and more specifically is directed to digital control circuits which may be employed to control the speed and/or phase of rotation of a head or other element in a video tape recorder.

2. Description of the Prior Art

The prior art contains examples of analog servo control circuits for control of the speed and/or phase of a motor. Typically, the analog devices of the prior art trigger the generation of a ramp signal upon the occurrence of a predetermined event, such as the passage of a magnetic pole piece attached to the rotating element, whose speed and/or phase is to be controlled, past a stationary sensing or pickup coil to provide a sensed signal. A reference signal, which occurs after the sensed signal, is employed to sample and hold the value of the ramp signal existing at the occurrence of the reference signal. Since the ramp signal changes at a known rate, the amplitude of the ramp signal at any given time is proportional to the time after its initiation. The sampled and held analog value which is proportional to the time between the sensed signal and the reference signal is employed as a drive signal for a motor.

Such analog devices depend on the resistance-capacitance time constant of circuit components employed for generation of the ramp signal, and typically employ capacitance storage elements to perform the sample and hold function. Due to the resistance and capacitance tolerances of discrete resistors and capacitors, manual adjustment is required during the manufacture and maintenance of such devices, thus adding to manufacture and maintenance costs. In addition, the servo characteristics of analog circuits employing capacitance and resistance tend to vary due to the temperature coefficient and aging of such elements. Further, a system employing analog techniques cannot practically be made as an integrated circuit. Even when maximum integration is achieved, it is still necessary to externally connect discrete resistors and capacitors since capacitors in particular are not compatible with integrated circuit manufacture and the range of resistance values attainable is not acceptable. Consequently, manufacturing costs are increased and the temperature and aging variations noted in the preceding are not overcome. Furthermore, the need for assembly steps to install and adjust for such discrete externally connected parts makes integrated circuit design with such external components meaningless. Furthermore, if such an integrated circuit with discrete components were produced, the number of pins for connection to and from the integrated circuit chips is increased and this increase, combined with the size of the discrete components themselves, interferes with the desired high density circuit packaging.

OBJECTS AND SUMMARY OF THE INVENTION

Accordingly, it is an object of the invention to provide a novel servo control system utilizing digital techniques.

Another object of this invention is to provide a digital servo control system which is adaptable to fabrication as an integrated circuit.

According to an aspect of the invention, a servo control apparatus for controlling the rotation of a rotary member comprises angular position pickup or indicating means for generating an angular position signal representing at least one predetermined angular position of the rotary member, drive means for rotating the rotary member, reference signal means for providing a reference signal, clock signal generating means for generating at least one clock signal comprised of repeated cycles having a predetermined frequency, counter means for counting cycles of the clock signal occurring between the angular position signal and the reference signal, and control means for controlling the rotation of the rotary member in response to the condition or content of the counter means.

The above, and other objects, features and advantages of the present invention will become apparent from the following description which is to be read in conjunction with the accompanying drawings in which like reference numerals designate the same elements.

BRIEF DESCRIPTION OF THE DRAWINGS

FIGS. 3A-3G are waveforms to which reference will be made in explaining the general principle of operation of a digital servo control circuit according to an embodiment of the present invention;

FIGS. 4A-4B are waveforms to which reference will be made in describing the principle of phase control employed in the present invention;

FIG. 5 is a block diagram of a digital servo control apparatus including a speed error detecting circuit according to an embodiment of the present invention;

FIG. 6 is a block diagram of a phase error detection circuit which is employed with the digital servo control apparatus of FIG. 5;

FIGS. 7A-7M are waveforms to which reference will be made in describing operation of the embodiment of the invention shown in FIGS. 5 and 6;

FIGS. 8A-8J are enlarged views of portions of FIGS. 7J-7M bracketed with the letter g on FIG. 7M, as well as additional significant signals to which reference will be made in describing the operation of the embodiment of the invention shown on FIGS. 5 and 6;

FIG. 9 is a schematic plan view of a part of a video tape recorder having rotary heads and means for generating reference signals so as to be suitable for use with the embodiment of the invention shown in FIGS. 5 and 6; and FIG. 10 is a plan view of a length of magnetic tape having represented thereon various tracks in which video, audio and control signals are recorded by means of a video tape recorder.

DETAILED DESCRIPTION OF THE PREFERRED EMBODIMENT

Figure 1:
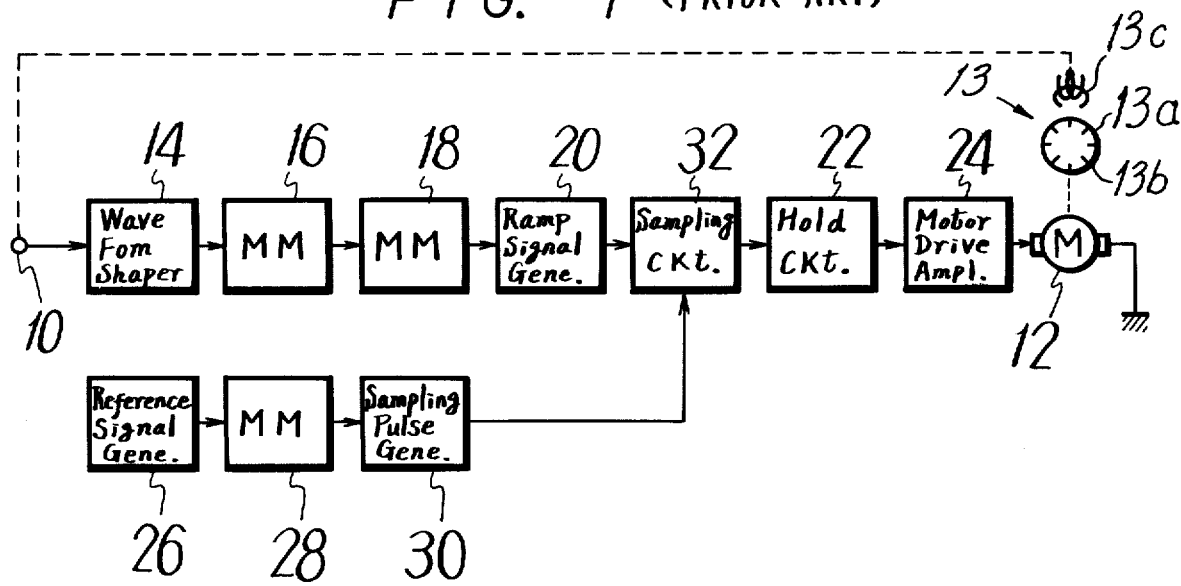
FIG. 1 is a block diagram of a servo control circuit according to the prior art.
Figure 2A:
FIGS. 2A-2G are waveforms to which reference will be made in explaining the operation of the prior art circuit of FIG. 1.

Referring initially to FIG. 1, a servo control circuit according to the prior art is shown in which the drive signal to a motor 12 is controlled to provide speed and/or phase control of the motor rotation. A rotational position signal generator 13 has, for example, a disc 13a mechanically coupled to rotate with the shaft of motor 12 which, for example, drives the heads of a video tape recorder. One or more magnetic pole pieces 13b may be affixed to disc 13a to rotate therewith past a pickup coil 13c. As each pole piece 13b moves past pickup coil 13c, a pulse $P_G$ (FIG. 2A) is induced in the pickup coil 13c, and such pulse $P_G$ is applied through an input 10 of the servo control circuit to a waveform shaper 14. Of course, other types of rotational position signal generators, such as, electro-optical, electro-static, and electromechanical devices or the like, may be substituted for the described electro-magnetic generator 13.

Figure 2B:
Figure 2C:

A delay monostable multivibrator 16 receives the output of waveform shaper 14 and generates an output pulse (FIG. 2B) which terminates a predetermined time later. A gating monostable multivibrator 18 is triggered ON by the negative-going trailing edge of the output of monostable multivibrator 16. The pulse output of gating monostable multivibrator 18 is coupled to the input of a ramp signal generator 20. When the output of gating monostable multivibrator 18 is present at the input of ramp signal generator 20, the latter generates a rising ramp signal (FIG. 2C) whose amplitude at any point is proportional to the time thereto from the beginning of the signal from gating monostable multivibrator 18.

Figure 2D:
Figure 2E:
Figure 2F:
Figure 2G:
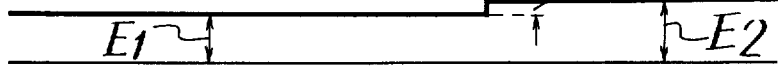

A reference signal generator 26 which can be any convenient source of a reference signal, such as, for example, a crystal oscillator, a line power frequency source, a vertical synchronizing signal source or a control signal which has been recorded on a magnetic tape, applies a pulse reference signal (FIG. 2D) to the input of a delay monostable multivibrator 28. In the example of the prior art shown on FIG. 1, the output of reference signal generator 26 is assumed to be a vertical synchronizing pulse. The delay monostable multivibrator 28 is triggered into producing a pulse output of fixed duration (FIG. 2E) by the negative-going leading edge of the signal from reference signal generator 26. The fixed delay pulse output of delay monostable multivibrator 28 is applied to the input of a sampling pulse generator 30 which thereupon applies a short sampling pulse (FIG. 2F) to a respective input of a sampling circuit 32. The sampling circuit 32, upon receiving the sampling pulse (FIG. 2F) samples the magnitude of the ramp signal (FIG. 2C) then appearing at its other input and applies the sampled magnitude to a hold circuit 22 which thereupon stores the sampled magnitude of the ramp signal until a new value or magnitude is received. The analog value stored in hold circuit 22 is applied to an input of a motor drive amplifier 24 so as to be amplified therein, and the resulting amplified drive signal (FIG. 2G) is applied to motor 12 for driving the latter.

In the example shown, prior to the occurrence of the sampling pulse (FIG. 2F), the voltage fed to the motor as a result of a signal stored in hold circuit 22 during the previous cycle has the value $E_1$. Upon the occurrence of the sampling pulse, a new voltage $E_2$, having an amplitude $\Delta E$ greater than $E_1$, is applied to motor 12 to increase the motor speed. Conversely, the voltage from amplifier 24 may actuate a brake which properly decreases or increases the retarding force on the motor in the proportion to its amplitude and thereby maintains the motor speed and phase in predetermined relationship to the reference signal from reference signal generator 26.

The principle of a digital servo control circuit according to the present invention will now be described with reference to FIGS. 3A–3G. In general, the purpose of such digital servo control circuit is to generate control signals which maintain constant the time T between a first event, such as, the generation of a pulse signal $P_G$ (FIG. 3A), and the occurrence of a second event, such as the positive going edge of a reference signal (FIG. 3B). The pulse signal $P_G$ of FIG. 3A may be, for example, the output of pulse generator 13 (FIG. 1), and the event producing the positive going leading edge of the signal in FIG. 3B may be, for example, the occurrence of a pulse from a crystal oscillator, a control signal reproduced from a magnetic tape, a line frequency pulse, or a vertical synchronizing signal.

In order to avoid the necessity for a ramp signal generator and a sample and hold circuit to generate a motor control signal, the present invention employs pulse width modulation to produce a signal which contains more or less energy in accordance with the coincidence, or lack of coincidence of the positive going edge of the reference signal in FIG. 3B with the expiration of the period T measured from the rotational pulse signal $P_G$. The signals in FIGS. 3A and 3B may be employed to define the leading and trailing edges of a pulse signal, such as shown in FIG. 3C, and which defines one control cycle of the digital servo control circuit. During the control cycle of FIG. 3C a large number of clock pulses, such as are shown on FIG. 3D, are counted in a counter. FIGS. 3E, 3F and 3G respectively show the outputs of a first stage $CT_1$, a second stage $CT_2$ and an Nth stage $CT_N$ of a counter. Although other relationships are possible, it is assumed that, when the time from rotational pulse signal $P_G$ (FIG. 3A) to the positive going edge of the reference signal (FIG. 3B) is precisely equal to the period T, the Nth stage of the counter accomplishes one full cycle beginning in coincidence with the pulse signal $P_G$ of FIG. 3A and ending at (2) on FIG. 3G in coincidence with the positive going leading edge of the reference signal or event shown on FIG. 3B. In the example illustrated on FIG. 3G, this results in a pulse signal which has equal low and high parts, that is, a duty cycle, or ON time of 50 percent. The average energy in such signal is midway between extreme low and high values.

If the period from pulse $P_G$ to the positive going edge of the reference signal is shorter than the time T and terminates at the point (1) on FIG. 3G, the resulting pulse signal from the Nth stage of the counter contains less energy than previously indicated. Conversely, if the period from pulse $P_G$ to the positive going edge of the reference signal is longer than the time period T, and therefore terminates at point (3) on FIG. 3G, this produces a pulse width modulated signal having greater average energy than the signal with a 50 percent duty cycle. The variation of the average energy of the pulse width modulated signal from that for the 50 percent duty cycle is then used to either increase or decrease the speed being controlled, for example, the speed of rotation of the rotary heads in a video tape recorder (VTR).

The relationship between the pulse signal $P_G$ (FIG. 4A) and the positive going leading edge of a reference signal (FIG. 4B) is further defined by a phase angle $\phi$. Whether controlling the speed or the phase relationship, the digital servo control circuit periodically adjusts it output to return the phase angle $\phi$ to its predetermined value.

The generation of signals to be employed in a digital servo control circuit according to the present invention will now be described with reference to FIGS. 9 and 10.

A conventional magnetic video tape 35 (FIG. 10) may have recorded thereon in a well known manner a plurality of skewed video tracks 37 as well as an audio track 36 parallel to one longitudinal edge of the tape and a control track 38 along the other longitudinal edge of the tape. Although not necessary to the practice of the invention, each of the tracks 37 may conventionally contain the video information for a single field. The control track 38 may have control signals recorded therein at spaced apart locations corresponding to the tracks 37 in response to the vertical synchronizing pulses of the video signal recorded in the tracks 37.

The skewed video tracks 37 are recorded and/or reproduced by first and second video heads 39A and 39B (FIG. 9) which are rotated about a rotary shaft 41 in a well known manner. A disc 40 may be affixed to the shaft 41 to rotate with video heads 39A and 39B. A plurality, suitably six, of magnetic pole pieces 42A–42F are spaced apart at equal angles about the perimeter of the disc 40. A first pickup coil 43A and a second pickup coil 43B are angularly spaced apart, suitable 18 degrees apart, adjacent the perimeter of disc 40. As one of the magnetic pole pieces, for example pole piece 42B, moves in the clockwise direction indicated by the arrow past pickup coils 43A and 43B, a signal PGA is first generated in pickup coil 43A and then a second signal PGB is generated in coil 43B. The time between the signals PGA and PGB from pickup coils 43A and 43B is, of course, dependent upon the speed at which the video heads are rotating. In the embodiment shown, six output pulses or signals are generated by each of pickup coils 43A and 43B during each revolution of disc 40.

Another magnetic pole piece 44 is disposed on disc 40, and a pickup coil 45 is fixedly located so that, as magnetic pole piece 44 rotates there past once per revolution of disc 40, pickup coil 45 generates a pulse signal PGC. Conventionally, the magnetic pole piece 44 is aligned with one of the video heads, in the example shown video head 39A. Thus, the single pulse output PGC from pickup coil 45 bears a fixed relationship to the rotational position of video heads 39A and 39B. Although not necessary for the functioning of the invention, pickup coils 45, 43A and 43B are arranged so that the pulse PGC from pickup coil 45 precedes a pulse or signal PGA from pickup coil 43A which, in turn, precedes a pulse or signal PGB from pickup coil 43B. Following these three signals, an additional five pairs of PGA and PGB signals are generated by pickup coils 43A and 43B, respectively, before the next PGC signal is generated by pickup coil 45. The foregoing relationships between pulse signals PGC, PGA and PGB in the preferred embodiment are shown in FIGS. 7A–7C.

Referring now to FIGS. 5 and 6, it will be noted that the speed and phase control functions are performed in response to outputs 62a–62d from a counter 62 controlled by a quartz crystal 64 having a suitable frequency, for example, of 3.58 MHz. The outputs of counter 62, which acts as a timing clock, are as follows:

| OUTPUT LINE | SIGNAL | FREQUENCY |
| --- | --- | --- |
| 62a | $T_i$ (narrow pulses) | 3.5 KHz ($f_{CO}/1024$) |
| 62b | $f_{CO}$ | 3.58 MHz |
| 62c | $f_{C1}$ | 895 KHz ($f_{CO}/4$) |
| 62d | $f_{C2}$ | 112 KHz ($f_{CO}/32$) |

The narrow 3.5 KHz interval timing pulses $T_i$ are applied to a set input S of a flip-flop 70. Each interval timing pulse $T_i$ triggers the set output $FF_2$ of flip-flop 70 into the high condition. Flip-flop 70 is reset at a time in each cycle which is dependent on the speed and phase errors of a motor 76 for driving heads 39A and 39B. Thus, the output $FF_2$ of flip-flop 70 is pulse width modulated.

The 3.58 MHz clock pulses $f_{CO}$ are applied to a clock input CP of a 1024 bit counter 66. When the most significant digit (MSD) of 1024 bit counter 66 goes from high to low, the negative-going edge of this transition is differentiated in a differentiator 68 and the resulting pulse signal is applied to the reset input R of flip-flop 70. This terminates the high condition output $FF_2$ from flip-flop 70.

The time following an interval timing pulse $T_i$ at which flip-flop 70 is reset depends on the content or count of 1024 bit counter 66 at the occurrence of the interval timing pulse $T_i$. For example, if the content of 1024 bit counter 66 is zero at the instant an interval timing pulse $T_i$ occurs, the most significant digit (MSD) of 1024 bit counter 66 returns to zero 1024 cycles of clock signal $f_{CO}$ thereafter which is coincident with the occurrence of the next interval timing pulse $T_i$. Thus, flip-flop 70 remains in its set condition throughout the cycle and its output signal $FF_2$ has a duty cycle or ratio of ON time to OFF time, of 100 percent and contains its maximum energy. Furthermore, since exactly 1024 pulses of clock signal $f_{CO}$ occur between adjacent interval timing pulses $T_i$, unless an external event intervenes, 1024 bit counter is returned to exactly the same condition, that is, zero count in this example, at each occurrence of each interval timing pulse $T_i$.

In contrast to the preceding, if the content of 1024 bit counter is other than zero, for example, a count of 512, at the occurrence of an interval timing pulse $T_i$, a reset signal is applied to the reset input R of flip-flop 70 512 cycles of clock signal $f_{CO}$ after interval timing pulse $T_i$, and the high condition of output $FF_2$ is terminated at that time. The next interval timing pulse $T_i$ occurs 512 cycles of clock signal $f_{CO}$ after the termination of the high condition of output $FF_2$ and again sets flip-flop 70 to the high condition. In this example, the output $FF_2$ is repetitively high for 512 cycles of $f_{CO}$ and low for 512 cycles of $f_{CO}$ to result in a 50 percent duty cycle and an average energy of half that in the preceding example. Any duty cycle from zero to 100 percent can be achieved from output $FF_2$ by arranging for counts between 1023 and zero to exist in 1024 bit counter 66 at the occurrence of interval timing pulses $T_i$.

The 1024 bit counter 66 is periodically reset, in a manner to be described, so that the number contained in it at the occurrence of each interval timing pulse $T_i$ is related to speed and phase errors.

From the preceding description, it is evident that the duty cycle of output signal $FF_2$ can have any one of 1012 discrete values. Following each reset of 1024 bit counter 66 to a different value, the duty cycle of output signal $FF_2$ jumps to a corresponding different value and, if not measures are taken to prevent it, jerky control of motor 76 would result. In order to avoid jerky control of motor 76, the pulse width modulated output signal $FF_2$ from flip-flop 70 is applied to an integrator 72. Integrator 72 generates a slowly changing output signal which is proportional to the average energy in the output signal $FF_2$ and which smooths the change from one control value to another. This integrated signal is amplified by a motor drive amplifier 74 and applied to motor 76.

FIG. 5 is further seen to illustrate means for periodically applying a reset signal to a reset input R of 1024 bit counter 66, which reset signal is properly timed with respect to interval timing pulses $T_i$ so that an appropriate number will be contained in 1024 bit counter 66 at all later occurrences of interval timing pulses $T_i$ until the next reset signal is applied to the reset input R of 1024 bit counter 66. Specifically, in FIG. 5, such periodic reset signals are generated in response to errors in the rotational speed of video heads 39A and 39B (FIG. 9). Speed control is, of course, only required in the case of a dc motor. If an ac motor is substituted for motor 76, speed control is inherently provided by such motor and the speed control provided by the embodiment of FIG. 5 may be omitted. However, phase control according to the present invention would still be required with an ac motor.

Speed control is exercised in the embodiment of FIG. 5 by using the time difference between the occurrences of the two signals PGA and PGB to produce a properly timed reset signal for application to the reset input R of 1024 bit counter 66. The signal PGA (FIG. 7B) is shown to be applied through an input terminal 50 to an amplifier 51. The amplified output PGA' of amplifier 51 is applied to a delay circuit 54 and elsewhere in the apparatus as will be explained. Delay circuit 54 produces an output pulse (FIG. 7J) the trailing edge of which, when applied to a set input S of a flip-flop 56, triggers flip-flop 56 into its set condition to produce a high output on speed error gating signal $FF_1$ (FIG. 7K).

Signal PGB (FIG. 7C) is applied through an input terminal 52 to an amplifier 53. The amplified output PGB' of amplifier 53 is connected to the reset input R of flip-flop 56. The positive going leading edge of the signal PGB' is effective to reset flip-flop 56 and return speed error gating signal $FF_1$ to the low condition. As is clear from the foregoing description, the length of the high condition of speed error gating signal $FF_1$ is determined by the time between signals PGA and PGB. The delay circuit 54 is not a necessary part of the invention but is convenient to permit interlacing of the speed and phase error signals as will be explained.

The speed error gating signal $FF_1$ is applied to one input of an AND gate 82 which, at a second input, receives the 895 KHz signal $f_{C1}$. Thus, a number of 895 KHz pulses is gated through AND gate 82 in proportion to the difference in arrival times of signals PGA and PGB. A 1024 bit speed detecting counter 78 is reset upon the occurrence of the PGA signal by the amplified PGA' signal applied to its reset input R. The 895 KHz pulses gated through AND gate 82 by signal $FF_1$ are applied through OR gate 88 to a clock input CP of 1024 bit counter 78. Thus, at the end of speed error gating signal $FF_1$, 1024 bit counter 78 has stored therein a number or content which is proportional to the difference in arrival times of signals PGA and PGB.

The amplified signal PGB' is applied to the set input S of a flip-flop 58, and the output $FF_3$ of the latter is applied to the set input S of a flip-flop 60. The output $FF_{10}$ of flip-flop 60 is applied to the reset inputs R of flip-flops 58 and 60, and interval pulses $T_i$ are applied to the clock input CP of flip-flop 60. The set output $FF_3$ of flip-flop 58 is triggered ON by the leading edge of the signal PGB' (FIGS. 8B and 8I), and thereby enables the set input of flip-flop 60. Upon the next occurrence of an interval timing pulse $T_i$ (FIG. 8G) at the clock input CP of flip-flop 60, flip-flop 60 is triggered into its set condition and output signal $FF_{10}$ becomes high. This condition persists until the next arriving interval timing pulse $T_i$ at the clock input CP of flip-flop 60, at which time flip-flop 60 is reset. The negative going trailing edge of output signal $FF_{10}$, in being fed back to the reset input of flip-flop 58, resets flip-flop 58 in preparation for the next cycle. As is evident from the preceding description, the output signal $FF_{10}$ begins and ends with the first and second interval timing pulses $T_i$, respectively, following the occurrence of the PGB signal.

The timing-interval-wide output signal $FF_{10}$ is applied to one input of an AND gate 84 and one input of an AND gate 80. The second input of AND gate 84 receives the 3.58 MHz clock signal $f_{C0}$. Thus, beginning at one interval timing pulse $T_i$ and ending at the next occurring interval timing pulse $T_i$, the 3.58 MHz clock signal $F_{C0}$ is grated through OR gate 88 to the clock input CP of 1024 bit counter 78. The 1024 bit counter 78 completes exactly one cycle during this timing interval and produces a negative going MSD signal at a time which is dependent upon the number previously stored in 1024 bit counter 78 during the occurrence of speed error gating signal $FF_1$ from flip-flop 56. It will be recalled that the length of speed error gating signal $FF_1$ is dependent upon the time between the occurrences of signals PGA and PGB. Consequently, the time of occurrence of the MSD output of 1024 bit counter 78 after the interval timing pulse $T_i$ is likewise dependent upon the time between signals PGA and PGB. The greater the count stored in 1024 bit counter 78 during the occurrence of the speed error gating signal $FF_1$, the sooner after the beginning of the output signal $FF_{10}$ will the MSD signal be produced. The negative going edge of the MSD signal is differentiated in a differentiator 90 and is applied through AND gate 80, which is enabled by output signal $FF_{10}$, to the reset input R of 1024 bit counter 66. Thus, 1024 bit counter 66 is reset to zero following the occurrence of an interval timing pulse $T_i$ at a time which is dependent upon the difference in arrival time of the two signals PGA and PGB.

It will be noted from FIGS. 8A, 8B and 8G that a plurality of interval timing pulses $T_i$ occur between successive resets of 1024 bit counter 66. However, as previously explained, since exactly 1024 cycles of clock signal $f_{C0}$ occur between interval timing pulses $T_i$, once 1024 bit counter 66 is reset following a signal PGB, the time of occurrence of the MSD output of 1024 bit counter 66, and the consequent resetting of flip-flop 70, remains constant from cycle to cycle. This is illustrated in FIGS. 8H and 8J where, during output signal $FF_{10}$ (FIG. 8J) flip-flop 70 is reset as indicated by the arrow on FIG. 8H and the relative ON and OFF times of the pulse width modulated signal $FF_2$ continues as thus established until the next adjustment time following a signal PGB.

In addition to the correction achieved in the manner previously described in response to speed errors, a number is also stored in 1024 bit counter 78 which is dependent on phase errors between the angular position of the motor shaft and a reference angular position. A phase error gating signal MDF is applied to one input of an AND gate 86, and the 895 KHz clock signal $f_{C1}$ is applied to the second input of AND gate 86. A number of cycles of the 895 KHz signal $f_{C1}$ depending upon the length of the phase error gating signal MDF are gated through AND gate 86 and OR gate 88 to the clock input CP of 1024 bit counter 78. As will be explained, the phase error gating signal MDF applied to AND gate 86 occurs at a different time from the speed error gating signal $FF_1$ applied to AND gate 82. Thus the clock pulses gated by the two gating signals MDF and $FF_1$ are cumulative in 1024 bit counter 78 so as to determine the content or count in the latter, and both contribute to the establishment of the duty cycle of the motor drive signal.

Referring now to FIG. 6, it will be seen that, for generation of the phase error gating signal MDF, the signal PGC (FIG. 7A), occurring once per revolution of the recording heads (FIG. 9), is applied through an input terminal 100 to an amplifier 104 and the resulting amplified signal PGC' is applied to the input of an adjustable delay circuit 106. The adjustability of delay circuit 106 is provided to permit compensating for fixed delays in the phase of signal PGC with respect to a reference phase. Delay circuit 106 produces a pulse output (FIG. 7E) which is applied to the set input of a flip-flop 108 so that the latter is set by the negative going trailing edge of the pulse from delay circuit 106. A phase reference signal, for example, a vertical synchronizing pulse or a corresponding control signal recorded on control track 38 (FIG. 10) is applied through an input terminal 102 to the reset input R of flip-flop 108. The set output of flip-flop 108 (FIG. 7F) consequently has a duration which is dependent upon the relationship between the arrival times of the signal PGC at input terminal 100 and the reference signal at input terminal 102. This difference between arrival times is proportional to the error in phase between the actual angular position of the recording heads and their desired angular position. The set output of flip-flop 108 is applied to one input of an AND gate 110 for enabling the latter, and the 112 KHz clock signal $f_{C2}$ is applied to a second input of AND gate 110. Thus, the number of cycles of clock signal $f_{C2}$ gated through AND gate 110 by the set output of flip-flop 108 is proportional to the phase error.

A 256 bit counter 120 is reset upon the occurrence of PGC by the application of the amplified signal PGC' to its reset input R. The 112 KHz pulses gated through AND gate 110 by the phase error signal are applied through an OR gate 118 to the clock input CP of 256 bit counter 120. Thus, following the arrival of each pulse PGC, a number of 112 KHz pulses are counted in 256 bit counter 120 in proportion to the magnitude of the phase error. This number is stored once per revolution of the recording heads but is used several times during a revolution as will be explained below.

A flip-flop 112 receives the phase reference signal from input terminal 102 at its set input S. The set output $FF_{20}$ of flip-flop 112 is applied to the set input S of a flip-flop 114 which has its set output $FF_{21}$ fed back to the reset inputs R of flip-flops 112 and 114. Following the application of the phase reference signal to set input S of flip-flop 112, the output signal $FF_{20}$ from the latter enables the set input of flip-flop 114. The next occurring interval timing pulse $T_i$ applied to a clock input CP of flip-flop 114 triggers flip-flop 114 into its set condition. This produces a high level or condition of the set output $FF_{21}$ of flip-flop 114 which endures until the instant of the next occurring interval timing pulse $T_i$, at which time set output $FF_{21}$ goes low. Thus, the signal $FF_{21}$ (FIG. 7H) endures for one timing interval between an adjacent pair of interval timing pulses $T_i$ (FIG. 7I) immediately following the occurrence of a phase reference signal (FIG. 7D).

The signal $FF_{21}$ is applied, in parallel, to one input of each of AND gates 116, 124 and 130, and second inputs of AND gates 116 and 130 receive the 3.58 MHz clock signal $f_{C0}$. The 3.58 MHz pulses are gated through AND gate 116 for one timing interval and applied through OR gate 118 to clock input CP of 256 bit counter 120. A total of 1024 cycles of clock signal $f_{C0}$ are fed to 256 bit counter 120 during the timing interval between adjacent interval timing pulses $T_i$. This number of cycles of clock signal $f_{C0}$ advances 256 bit counter 120 through four complete cycles ending on the same count as originally contained therein. Simultaneously, a 256 bit counter 126 receives 1024 cycles of clock signal $f_{C0}$ gated through AND gate 130 by signal $FF_{21}$ and then applied through OR gate 132 to a clock input CP of counter 126. Each time the most significant digit (MSD) of 256 bit counter 120 returns to zero, a differentiating circuit 122 applies a negative going pulse to the second input of AND gate 124. Since AND gate 124 is enabled by the signal $FF_{21}$ at this time, the resulting gated output of AND gate 124 provides a reset signal SMD which is applied to the reset input R of 256 bit counter 126. Since 256 bit counter 126 is reset by signal SMD at its reset input R each time 256 bit counter 120 completes a cycle during the existence of the signal $FF_{21}$, at the termination of the signal $FF_{21}$, both of the 256 bit counters 120 and 126 will contain the same number when they come to rest after receiving 1024 cycles of clock signal $f_{C0}$, which number or content represents the phase error signal originally inserted into 256 bit counter 120.

A circuit consisting of a flip-flop 140, an AND gate 144, a 256 bit counter 142 and an AND gate 128 is effective to produce 256 pulses of the 895 KHz clock signal $f_{C1}$ following the occurrence of each signal PGA (that is, six times per revolution of the recording heads). More particularly, the amplified signal PGA' is shown to be applied to the set input S of flip-flop 140. The signal TSFT from the set output Q of flip-flop 140 (FIG. 8F) is applied to one input of AND gate 144 and to one input of AND gate 128. The 895 KHz clock signal $f_{C1}$ is connected to second inputs of AND gate 144 and AND gate 128. The output of 256 bit counter 142 is fed back to the reset input R of flip-flop 140, and the reset output $\bar{Q}$ of flip-flop 140 is applied to the reset input R of 256 bit counter 142. Upon the occurrence of amplified signal PGA', flip-flop 140 is set, and the resulting signal TSFT from output Q of flip-flop 140 enables AND gates 128 and 144 for the gating therethrough of the 895 KHz clock signal $f_{C1}$. 256 bit counter 142, which is initially reset, begins counting the pulses of clock signal $f_{C1}$ at its clock input CP. Upon reaching a count of 256, the output of 256 bit counter 142 undergoes a transition which is effective at the reset input R of flip-flop 140 to reset the latter. The removal from AND gates 128 and 144 of the enable signal TSFT (FIG. 7M) from the set output Q of flip-flop 140 terminates the gating of the 895 KHz clock signal $f_{C1}$ through AND gates 128 and 144. This occurs after the gating of exactly 256 cycles. In addition, the positive signal then occurring at the reset output $\bar{Q}$ of flip-flop 140 is effective, at the reset input R of 256 bit counter 142, to reset the latter in preparation for the next arriving signal PGA'.

The signal PGA' is also applied to the set input S of a flip-flop 136. The set output of flip-flop 136 is the phase error gating signal MDF (FIGS. 7L and 8E) which is fed to one input of AND gate 86 in FIG. 5. As the 256 pulses are gated into the clock input CP of the 256 bit or buffer counter 126, counter 126 goes through one complete cycle and returns to a standstill at the same count proportional to the phase error that it contained before the 256 pulses were gated into it. The negative going most significant digit (MSD) output from 256 bit counter 126 occurs within its 256 bit cycle at a point determined by the count originally located therein. This count, as previously described, is determined by the phase error originally stored in 256 bit counter 120 and transferred into 256 bit counter 126 during the occurrence of the signal $FF_{21}$. Consequently, the time at which the MSD output of counter 126 occurs is proportional to the phase error. The MSD signal from 256 bit counter 126 is differentiated in a differentiator 34 and the resulting negative pulse is applied to the reset input R of flip-flop 136 to terminate the phase error gating signal MDF.

Referring again to FIG. 5, it will be seen that phase error gating signal MDF is applied to one input of AND gate 86 and, thereby, enables the gating therethrough of the 895 KHz clock signal $f_{C1}$ and the application of this signal through OR gate 88 to the clock input CP of 1024 bit counter 78. It should be noted that the phase error gating signal MDF (FIG. 7L) is generated six times per revolution of the recording head, that is, following each occurrence of the signal PGA, whereas the phase error is detected only one time per revolution of the recording head, that is, following the signal PGC (FIG. 7A). However, since 256 bit counter 126 (FIG. 6) is driven through exactly 256 clock pulses following the receipt of each signal PGA, 256 bit counter 126 is always returned to its starting count at the end of the 256 input pulses. Consequently, until a new phase error is detected and transferred into 256 bit counter 126, the phase error gating signal MDF from flip-flop 136 repeats the same timing in each of its cycles.

Referring now to FIGS. 8A–8J, it will be seen that the phase error gating signal MDF (FIG. 8E) which loads the phase error into 1024 bit counter 78 occurs during the delay pulse output from /delay circuit 54 (FIG. 8C) fed to the set input S of flip-flop 56. Consequently, the storage of pulses in 1024 bit counter 78 in proportion to the phase error is completed before the end of the delay pulse from delay circuit 54 (FIG. 8C). After the end of the delay pulse from delay circuit 54, the speed error gating signal $FF_1$ (FIG. 8D) enables the further storage of pulses in 1024 bit counter 78 in proportion to the speed error. Consequently, pulses proportional to both the phase error and speed error are entered into 1024 bit counter 78 six times during each revolution of the recording heads (FIG. 9) and a reset signal from 1024 bit counter 78, after being differentiated in differentiator 90, is applied to the reset input R of 1024 bit counter 66 following each occurrence of the signal PGB. Thus 1024 counter 66 is reset at a time which reflects both the phase and speed errors as described. The recurring MSD outputs of 1024 bit counter 66 which are differentiated in differentiator 68 and applied to the reset input R of flip-flop 70, are also responsive to both phase and speed errors. Therefore, the average energy in the output signal $FF_2$ of flip-flop 70 is varied according to both phase and speed errors in the direction tending to cause the average output signal from integrator 72, when amplified by amplifier 74, to be effective to apply a signal to motor 76 which adjusts the motor torque so as to eliminate the phase and speed errors.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A servo control apparatus for controlling the rotation of a rotary member comprising:
   drive means for rotating said rotary member;
   means for generating first angular position signals related to a first angular position of said rotary member;
   means for generating reference signals related to a second angular position of said rotary member;
   at least some of said first angular position signals and said reference signals cyclically occurring in spaced pairs;
   clock signal generating means for generating at least one clock signal comprised of repeated cycles having a predetermined frequency;
   counter means for counting said cycles of said clock signal occurring in a time interval related to the time interval between said spaced pairs to produce a stored value therein;
   means for clocking said counter means from said stored value to a predetermined value;
   means for generating at least one pulse-width-modulated pulse having a width related to a time at which said counter means reaches said predetermined value; and
   means for controlling said drive means in response to said pulse-width modulated pulse.

2. A servo control apparatus according to claim 1; wherein said reference signal generating means includes means for providing a phase reference signal related to a desired angular position of said rotary member, said stored value is related to the phase of said rotary member with respect to said desired angular position.

3. A servo control apparatus according to claim 1; wherein said reference signal generating means includes means for generating a second angular position signal related to a second angular position of said rotary member whereby said stored value is related to the rotational speed of said rotary member.

4. A servo control apparatus according to claim 1; wherein said means for generating a reference signal includes a phase reference signal generating means for providing a phase reference signal related to a desired angular position of said rotary member, and means for generating a second angular position signal representing at least a second angular position of said rotary member whereby said stored value is related to the phase of said rotary member with respect to said one predetermined angular position and to the rotational speed of said rotary member.

5. A servo control apparatus according to claim 1; wherein said means for generating a first angular position signal includes magnetic means integrally rotating with said rotary member and stationary pickup means disposed within the influence of said magnetic means.

6. A servo control apparatus according to claim 1; wherein said clock signal generating means is operative to generate an interval timing pulse every N cycles of said at least one clock signal; and said means for generating at least one pulse-width-modulated pulse includes circuit means responsive to said interval timing pulse to initiate a first part of a cycle of a pulse width modulated signal, an N-bit counter operative in response to N cycles of said at least one clock signal to execute one complete cycle from a first number therein and returning to said first number therein at the end of said one complete cycle, means responsive to attainment of a second number in said N-bit counter for terminating said first part of a cycle and initiating a second part of the cycle in said circuit means, and transferring means for setting the relationship between a number in said N-bit counter and said interval timing pulse in relationship to the contents of said counter means whereby the ratio of said first part to said second part of said pulse width modulated signal is controlled.

7. A servo control apparatus according to claim 6; further comprising an integrator receiving said pulse width modulated signal and generating an output signal for application to said drive means.

8. A servo control apparatus according to claim 6; wherein said counter means includes a second N-bit counter.

9. A servo control apparatus according to claim 8; wherein said transferring means includes gating means synchronized with each said interval timing pulse for gating N cycles of said at least one clock signal into said second N-bit counter whereby said second N-bit counter is cycled through one complete cycle beginning and ending with the number related to the number of clock cycles occurring between said first angular position signal and said reference signal, said second N-bit counter being responsive to attainment of a third number therein to produce a reset signal which is applied to a reset input of the first mentioned N-bit counter so as to reset the same.

10. A servo control apparatus according to claim 9; wherein said second and third numbers are zero.

11. A servo control system for controlling the rotation of a rotary member comprising: clock signal generating means for generating clock pulses; refeence signal generator means for generating reference pulses; rotation signal generating means attached to said rotary member for generating rotation signal pulses; driving means for rotating said rotary member; rotation speed detecting means having first counter means for counting a predetermined number of said clock pulses during time intervals between successive rotation signal pulses from said rotation signal generating means to produce a first stored value therein; rotation phase detecting means having second counter means for counting a predetermined number of said clock pulses during a time interval between a reference pulse from said reference signal generating means and a rotation signal pulse from said rotation signal generating means; means for supplying pulses to be added to said first stored value in said first counter means in relation to the pulses counted in said second counter means to produce a second stored value in said first counter means; means for clocking said first counter means from said second stored value to a predetermined value; and circuit means for controlling the rotation of said rotary member in accordance with the time at which said first counting means reaches said predetermined value.

12. A servo control system according to claim 11; wherein said circuit means includes buffer counter means for counting a predetermined number of clock pulses from said clock signal generator means, and means for transferring the content of said first counter means of the rotation speed detecting means to said buffer counter means when said first counting means reaches said predetermined value.

13. A servo control system according to claim 12; wherein said means for clocking is operative to clock said first counter means no oftener than once in at least two cycles of said buffer counter means.

14. A servo control system according to claim 12; wherein said rotation phase detecting means further includes second buffer counter means for counting a predetermined number of clock pulses from said clock signal generator means, second means for transferring the content of said second counter means to said second buffer counter means, and third means for transferring the content of said second buffer counter means to said first counter means.

15. A servo control system according to claim 11; wherein said rotation phase detecting means further includes buffer counter means, first means for transferring the content of said second counter means to said buffer counter means, and second means for transferring the content of said buffer counter means to said first counter means of the rotation speed detecting means.

16. A servo control system according to claim 15; wherein said means for transferring the content of said second counter means to said buffer counter means fuctions no oftener than once in at least two cycles of said buffer counter means.

17. A servo control system according to claim 11; wherein said circuit means is coupled to said driving means, and said driving means includes a motor.

18. A servo control system according to claim 11; wherein said circuit means includes means includes a flip-flop circuit, and means by which the content of said first counter means of the rotation speed detecting means is converted into a pulse-width modulated signal.

19. A servo control system according to claim 11; wherein said roatary member carries video head means for recording or reproducing video signals on a magnetic tape, and each of said reference pulses supplied to said rotation phase detecting means is related to a vertical synchronizing signal of the video signal recorded on the magnetic tape.

20. A servo control system according to claim 19; wherein each of said reference pulses supplied to said rotation phase detecting means is related to a control signal reproduced from said magnetic tape.

21. A servo control apparatus for controlling the rotation of a rotary member comprising: motor means for rotating said rotary member, a clock signal generator operative to generate a first clock signal and spaced interval timing pulses with N cycles of said first clock signal between succeeding interval timing pulses, a first N-bit counter operative in response to N cycles of said first clock signal to execute a complete cycle beginning and ending on the same number, reset means for generating a reset signal when the contents of said first N-bit counter reaches zero, a flip-flop circuit responsive to each said interval timing pulse to produce a first output condition and responsive to said reset signal to produce a second output condition, said first and second output conditions defining the pulse width of a pulse width modulated signal having an average energy, means for applying a signal related to the average energy of said pulse width modulated signal to said motor means, a second N-bit counter, means for gating a first group of cycles of a clock signal into said second bit N-bit counter with the number of cycles in said first group being related to the rotational speed of said rotary member, an M-bit counter having a capacity M integrally related to N, means for storing a second group of clock cycles in said M-bit counter with the number of cycles in said second group being related to an error in phase of said rotary member, first means for transferring a phase error number related to said second group into said second N-bit counter in which said phase error number is added to said number of cycles in said first group to produce a total error number related to both the speed and phase of said rotary member, and second means for transferring said total error number into said first N-bit counter whereby said reset means generates said reset signal at a time related to said total error number.

22. A servo control apparatus according to claim 21; wherein said first N-bit counter executes at least two cycles between successive transferring operations of said second means for transferring.

23. A servo control apparatus according to claim 21; wherein said first means for transferring includes a second M-bit counter, third means for transferring said number of cycles of the second group in the first-mentioned M-bit counter into said second M-bit counter, and fourth means for transferring said phase error number related to said second group from said second M-bit counter to said second N-bit counter.

24. A servo control apparatus according to claim 23; wherein said first means for transferring further includes means for operating said fourth means for transferring at least twice for each operation of said third means for transferring.

25. A servo control apparatus for controlling rotation of a rotary member comprising:
   drive means for rotating said rotary member;
   means for generating first and second angular position signals related respectively to first and second angular positions of said rotary member;
   means for generating a phase reference signal related to a third angular position of said rotary member;
   clock signal generating means for generating cycles of a first clock signal and a basic timing signal defining a basic timing interval, said basic timing interval containing a fixed predetermined plurality of said cycles of said first clock signal;
   means for controlling one of a leading and a trailing edge of a pulse-width-modulated signal in response to said basic timing signal;
   first counter means having a first caacity;
   means for continuously clocking said first counter means with said first clock signal;
   means for controlling the other of said leading and trailing edges in response to said first counter means reaching a predetermined content;
   second counter means having a second capacity integrally related to said first capacity;
   means for counting cycles of said first clock signal into said second counter means during a first jtime period related to a time between said phase reference signal and one of said first and second angular position signals whereby a first stored number related to a phase of said rotary member is stored in said second counter means;
   means for counting cycles of said first clock signal into said second counter means during a second time period related to a time between said first and second angular position signals whereby a second stored number related to both said phase and a speed of said rotary member is stored in said second counter means;
   means synchronized with said basic timing signal for clocking said second counter means during a third time period from said second stored number at least to a predetermined value whereat said second counter means is operative to produce a reset signal;
   means responsive to said reset signal for resetting said first counter means whereby the relationship of the condition of said first counter means to said basic timing interval is established according to said second stored number; and
   said first, second and third time periods are non-coincident.

* * * * *